United States Patent
Bonneville et al.

(10) Patent No.: US 12,418,487 B2
(45) Date of Patent: Sep. 16, 2025

(54) METHOD OF PROCESSING SET OF STREAM IN VIEW OF CONFIGURING TIME-SENSITIVE NETWORK, AND TIME-SENSITIVE NETWORK SYSTEM

(71) Applicant: Mitsubishi Electric Corporation, Tokyo (JP)

(72) Inventors: Herve Bonneville, Rennes (FR); Artem Boryskin, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 326 days.

(21) Appl. No.: 18/020,024

(22) PCT Filed: Apr. 16, 2021

(86) PCT No.: PCT/JP2021/016386
§ 371 (c)(1),
(2) Date: Feb. 6, 2023

(87) PCT Pub. No.: WO2022/070489
PCT Pub. Date: Apr. 7, 2022

(65) Prior Publication Data
US 2023/0291692 A1 Sep. 14, 2023

(30) Foreign Application Priority Data
Sep. 30, 2020 (EP) .................................... 20306136

(51) Int. Cl.
*H04L 47/2416* (2022.01)
*H04L 41/5051* (2022.01)

(52) U.S. Cl.
CPC ...... *H04L 47/2416* (2013.01); *H04L 41/5051* (2013.01)

(58) Field of Classification Search
None
See application file for complete search history.

(56) References Cited

U.S. PATENT DOCUMENTS 11,736,359 B2 * 8/2023 Jabbar .................... H04L 41/12
370/254
2018/0132234 A1 * 5/2018 Cavalcanti ............ H04W 72/02
(Continued)

FOREIGN PATENT DOCUMENTS

| EP | 4125249 A1 * | 2/2023 | ............. H04L 47/76 |
| WO | WO 2020/035133 A1 | 2/2020 | |
| WO | WO-2020036911 A1 * | 2/2020 | ......... H04L 47/2491 |

OTHER PUBLICATIONS

Bello at al., 'Schedulability analysis of Time-Sensitive Networks with scheduled traffic and preemption support', Journal of Parallel and Distributed Computing 144 (Jun. 2020) p. 153-171 (Year: 2020).*

(Continued)

*Primary Examiner* — Sandarva Khanal
(74) *Attorney, Agent, or Firm* — Birch, Stewart, Kolasch & Birch, LLP

(57) ABSTRACT

Methods and products for processing stream requests are provided. Upon obtaining the stream requests, an initial TSN scheduling is computed at a CNC based on an initial TSN capability obtained from a dynamic bridge (DB). Then, a loop is started. At each iteration, it is determined, based on information related at least to the last computed TSN scheduling, whether or not to provide information related to an updated TSN capability of the DB to the CNC. If it is decided to provide said information, the CNC computes, based on said information, an updated TSN scheduling. Else, the loop is exited. It is determined, based on at least one computed TSN scheduling, whether to configure the TSN according to one of said at least one computed TSN sched- (Continued)

uling or to request an adjustment of at least one stream request.

12 Claims, 6 Drawing Sheets

(56) References Cited

U.S. PATENT DOCUMENTS

| | | | |
|---|---|---|---|
| 2020/0028791 A1* | 1/2020 | McGrath | H04L 41/145 |
| 2021/0306901 A1* | 9/2021 | Mannweiler | H04L 12/4633 |
| 2022/0014485 A1* | 1/2022 | Pocovi | H04L 1/1877 |
| 2022/0201719 A1* | 6/2022 | Jiang | H04W 72/23 |
| 2022/0264355 A1* | 8/2022 | Li | H04L 12/14 |

OTHER PUBLICATIONS

Hirschmann (2016 White-Paper), 'TSN-Time-Sensitive-Networking' (Year: 2016).*

* cited by examiner

METHOD OF PROCESSING SET OF STREAM IN VIEW OF CONFIGURING TIME-SENSITIVE NETWORK, AND TIME-SENSITIVE NETWORK SYSTEM

TECHNICAL FIELD

The disclosure belongs to the field of telecommunications.

In particular, there are disclosed methods for processing a set of stream requests in view of configuring a time-sensitive network, such as a wireline time-sensitive (TS) bridged network comprising a wireless bridge, e.g. 3GPP/5G system. There are further disclosed corresponding time-sensitive network systems, entities of such systems, computer programs, computer-readable storage media and processing circuits.

BACKGROUND ART

Fast and reliable communication & information networking and, in particular, the time sensitive networking (TSN) is essential for a smart factory environment. It allows integration across the factory by closely connecting the individual production steps as well as production planning and logistics.

To provide the sought connectivity, the industrial networks need to support various types of traffic, including time sensitive (TS) traffic used for real-time control over the machines and services that require deterministic performance.

Time sensitive networking (TSN) is standardized in IEEE 802.1Q to provide industrial networks with deterministic delay to handle TS traffic. The end-to-end communication deadlines and bounded jitter are guaranteed through a number of mechanisms such as time synchronization and TSN scheduling of individual frames and streams, e.g. in terms of per-stream and per-port gate control lists generated for all components within the network, as standardized in IEEE 802.1Qcc.

Initially, TSN networking was intended for wireline networks, capable of supporting the high-speed communication between sensors/controllers and IT centers. Moving from wired to wireless sensors and actuators provide additional advantages, such as mobility, scalability, and reduced maintenance cost.

To connect the wireless devices to a TSN network, wireless transmission technologies such as the ones defined in 3GPP are necessary.

The integration between the wired and wireless technologies raises a number of challenges that are not fully resolved yet, such as the standards compatibility as well as the peculiarities of data transmission through the (bounded) wired and (open) wireless media.

Although the description of a wireless network below is focused on 3GPP/5G networks, it can be generalized to any wireless communication system.

Some TSN use cases are computationally complex and require time-consuming computation of the per-stream and/or per-port gate control lists for each component within the entire network. To accommodate this sort of TSN use cases, it is beneficial to centralize the computations in a single centralized entity capable of gathering information about the entire network in order to find the best network configuration and the schedule for each component therein. Such a model is commonly referred as Centralized.

Such a configuration loop proposed for wireline TSN in IEEE 802.1Qcc is schematically shown in FIG. 1 with a detailed workflow represented in FIG. 2.

In such centralized model, a Centralized User Configuration (CUC) entity (3) discovers (10) end stations (ES) (1), retrieves (11,12) ES capabilities and user requirements, and configures TSN features in said end stations by creating (13) a set of stream requests. The configuration information is then provided (14) to a Centralized Network Configuration (CNC) entity (2).

The CNC may access (15) (if already accessible) or discover (16) the network physical topology. The CNC may further access (17) (if already accessible) or read (18) the TSN capabilities of all bridges on the network.

Having obtained all required configuration information, the CNC generates (19) a schedule which is tested (20) for compliance with the requirements for the set of stream requests. If successful, the CUC prepares (22) all end stations and the CNC configures (23) all Bridges for TSN streams. The CNC has a complete view of the physical topology of the network as well as the capabilities of all Bridges.

In case CNC cannot find a schedule that satisfies requirements for all stream requests provided by CUC, a new iteration of the TSN configuration loop is initiated comprising a step of adjusting (21) the initial stream requests.

The embodiment in FIG. 1 assumes that the network physical topology and the TSN capabilities of all components (=bridges) are fixed and independent from the traffic load. The static nature of the wired components allows CNC to read the network physical topology and the bridge TSN capabilities only once and then use these data for TSN scheduling procedure whatever the number of iterations is required to generate a successful schedule corresponding to the initial (or adjusted) stream request.

In principle, this embodiment allows for seamless integration between TSN and 5G networks, provided the internal functionality of the latter is hidden from CNC. This can be done, for instance, using a so-called TSN Translator (TT) entity enabling bi-directional communication between CNC and 5GS for both the data and control information, thanks to the conversion of the TSN commands provided by CNC (e.g. defined by IEEE 802.1) in terms of a specification parameters understood by a wireless network (e.g. defined by 3GPP) and vice-versa. This allows CNC to deal with 5GS as with a virtual TSN bridge having the same properties as an ordinary wired TSN bridge.

While the use of TT simplifies integration between TSN and 5GS, it does not provide means for configuring 5GS, whose performance characteristics, unlike those of a static wired bridge, depend on the traffic load and the radio resource allocation (RA) used by 5GS to support said traffic.

The dynamic nature is intrinsic to wireless bridges and, in particular, to 3GPP/5GS because all internal links between ports of such a virtual bridge pass through a shared wireless medium. To avoid a crosstalk between different ports resulting in stream collisions, different RA and time/frequency multiplexing techniques are used resulting in different TSN capabilities of 5GS, being a function of traffic load.

This makes the network configuration procedure represented in FIGS. 1 and 2 inefficient at least in what concerns the selection of an appropriate internal configuration of 5GS among different possible ones available through different RA allocations.

The freedom of selecting different RA provides 5GS with the agility that is not available in wired TSN bridges. However, at present, these additional degrees of freedom are not accessible to CNC due to the limitations of the existing TSN configuration procedure.

There is no solution available so far to resolve these issues that constitutes a bottleneck for an effective integration between wireline TSN and 5GS networks. These issues are intrinsic to any TSN network comprising a 5GS wireless bridge or, more generally, to any TSN network comprising at least one dynamic component, characterized in supporting at least two different internal configurations associated with two different TSN capabilities.

As explained above, it is highly desirable to make sure that 5G system is used at its best inside a TSN network.

The established TSN configuration and scheduling procedures used for TSN networks assume that all components (links and bridges) are static, in the sense that each component can be characterized by a single set of parameters describing its TSN capability that remain constant and independent from the traffic load on said component. This assumption is generally true for wired links and bridges, but fails for wireless components typically characterized in having a variable TSN capability that depends on the traffic load and the internal configuration used by said component to support the required traffic load. This creates a bottleneck for effective integration between the wireline (e.g. IEEE 802.1) and wireless networks (e.g. 3GPP/5G).

More specifically, the established TSN configuration & scheduling methods provide no means to CNC for evaluating different internal configurations of a wireless component, whereas said wireless component usually provides a conservative value of its TSN capability defined with respect to a hypothetical worst-case scenario, rather than the actual traffic load. This impacts the overall end-to-end (e2e) delay and prevents the wireless network to work at its best that eventually affects the performance of the TSN network as a whole.

It is to be noted that the abovementioned constraints of the prior art are intrinsic to any hybrid TSN network comprising at least one dynamic component, said dynamic component characterized in having at least two different TSN capabilities associated with different internal configurations. Resolving said constraints can pave the way for next generation of TSN networks comprising dynamic components (wired or wireless), characterized in their capacity of adapting their TSN capabilities depending on the intended use.

SUMMARY OF INVENTION

The invention is defined by the appended independent claims. Additional features and advantages of the concepts herein disclosed are set forth in the description which follows.

An objective of the present invention is to overcome the above limitations.

Here is thus disclosed a method of processing a set of stream requests in view of configuring a time-sensitive network comprising at least a centralized network configuration entity operably connected to a plurality of end station entities and to a dynamic bridge entity,
the method comprising, upon obtaining a set of stream requests from and/or to at least part of the plurality of end station entities:
at the centralized network configuration entity, computing, based on an initial time-sensitive network capability obtained at least from the dynamic bridge entity, an initial time-sensitive network scheduling that sets times of transmission and of reception of packets through the network at least from one end station of the plurality of end stations to another,
performing a sequence of:
determining, based on information related at least to the last computed time-sensitive network scheduling, whether to provide information related to an updated time-sensitive network capability of the dynamic bridge to the centralized network configuration entity,
then, if the information related to the updated time-sensitive network capability of the dynamic bridge are to be provided to the centralized network configuration entity, providing said information to the centralized network configuration entity, computing, at the centralized network configuration entity, an updated time-sensitive network scheduling based on the provided information related to the updated time-sensitive network capability and restarting the sequence, and
if the information related to the updated time-sensitive network capability are not to be provided to the centralized network configuration entity, ending the sequence, and
determining, based on at least one computed time-sensitive network scheduling, whether to configure the time-sensitive network according to one of said at least one computed time-sensitive network scheduling or to request an adjustment of at least one stream request in view of configuring the time-sensitive network based on a resulting adjusted set of stream requests.

The sequence above is a modification of the established TSN configuration procedure intelligent selection in the form of a new logical function enabling intelligent selection whether a new TSN capability of a dynamic component (e.g., wireless dynamic bridge) within said TSN network must be tested or not. This selection is at least driven by the output of the TSN-CNC scheduler and targets an improvement of performance of said TSN network as a whole. In a time-sensitive network, a dynamic bridge entity is an entity allowing communication with a plurality of end stations and which TSN capabilities vary depending on the traffic load. For example, the dynamic bridge entity may be configured to adapt its radio resource allocation to best support a given traffic load.

The implementation of the logical function enabling the intelligent selection is: a stand-alone node, or integrated within the CNC or dynamic bridge (DB), or split and implemented partly within these two nodes. According to the implementation, the logical function has access to basic or more complete knowledge of the CNC and/or DB. This knowledge is, for example, gathered through new interfaces and signaling. The more knowledge is obtained, the more intelligent the selection.

The intelligent selection allows for applying the best-found configuration of dynamic bridge (DB) before proceeding with the usual process of: going back to the CUC and adjusting the original stream request if the TSN scheduling fails, and of applying the overall TSN configuration if the requirements are met. The method above can be considered in a more general sense, as a method for intelligent resource management in an information network comprising a dynamic component characterized in having access to a shared limited resource and having at least two different internal configurations associated with different networking capabilities provided thank to different repartition of said shared resource.

More details are provided on the different options in the following.

The main expected advantage of the present invention is the improved overall performance of a hybrid TSN network comprising at least a dynamic bridge (DB), achieved thanks to the selection of an appropriate internal configuration of said DB.

An additional advantage can be a reduced timing of the scheduling procedure, achieved thanks to introduction of the DB configuration loop inside the established TSN scheduling procedure.

In an example, processing the set of stream requests comprises:
  obtaining information related to a selected time-sensitive network scheduling, and
  based on said obtained information, whether to configure the time-sensitive network according to the selected computed time-sensitive network scheduling or to request an adjustment of at least part of the set of stream requests.

This allows configuring the time-sensitive network according to the computed TSN scheduling for the best-found configuration of the dynamic bridge only if the information related to said computed TSN scheduling meet a preset criterion.

In an example, the information related to the initial time-sensitive network scheduling comprise at least information related to a value of a figure of merit function representing a degree of success of the initial time-sensitive network scheduling in terms of satisfying at least part of the set of stream requests.

In an example, the information related to at least one computed time-sensitive network scheduling comprises a parameter representing a degree of success of said at least one computed time-sensitive network scheduling, as a whole, in response to the set of stream requests. For example, each parameter may be a single binary success/failure parameter or a single real-value parameter representing a "degree of success" of said TSN scheduling procedure considered as a whole.

In an example, the information related to at least one computed time-sensitive network scheduling comprises a set of parameters, each parameter representing a degree of success of said at least one computed time-sensitive network scheduling in response to a corresponding stream request of the set of stream requests. For example, the parameters may be a set of values (binary or real) representing a "degree of success" of said scheduling per stream.

In an example, at least part of the information related to at least one computed time-sensitive network scheduling is further related to the dynamic bridge entity.

For instance, said obtained information related to TSN scheduling may also comprise information related to the TSN Scheduling itself (e.g. gate control list, per stream priority, etc.), such as information as generated for at least one port of at least said DB. As a result, in this example, the decision of whether to provide information related to an updated time-sensitive network capability to the CNC is based on the information related to the role of the dynamic bridge entity in processing the streams. For example, as explained above, obtaining an information indicating that at least one stream request is not satisfied may be sufficient, in some embodiments, for determining that information related to an updated time-sensitive network capability shall be provided to the CNC. However, in other embodiments, it may also be possible to further obtain additional information, related to the TSN scheduling itself. Examples of such additional information may include whether the troublesome stream actually passes through the dynamic bridge. Using such additional information, an additional logical condition may be defined. For instance, it may be determined that:
  if the troublesome stream passes through the dynamic bridge, then an updated time-sensitive network capability shall be provided to the CNC, and
  if, on the contrary, the troublesome stream does not pass through the dynamic bridge, then the sequence shall be ended without providing any further updated time-sensitive network capability to the CNC.

The examples above allow configuring the time-sensitive network according to the computed TSN scheduling for the best-found configuration of the dynamic bridge only if said computed TSN scheduling is successful in satisfying, at a sufficient degree, a sufficient number of requests of the set of stream requests.

In an example, the method further comprises, a plurality of time-sensitive network schedulings having already been computed through previous iterations of the sequence, determining whether to provide information related to an updated time-sensitive network capability to the centralized network configuration entity is further based on comparing the number of computed time-sensitive network schedulings with a predetermined threshold.

In an example, determining, based on information related at least to the last computed time-sensitive network scheduling, whether to provide information related to an updated time-sensitive network capability to the centralized network configuration entity, comprises:
  retrieving, processing or computing, based on the information related at least to the last computed time-sensitive network scheduling, an information related to an overall degree of success of the last computed time-sensitive networks scheduling, and
  determining, based on the retrieved, processed or computed information related to the overall degree of success of the last computed time-sensitive networks scheduling, whether to provide information related to an updated time-sensitive network capability to the centralized network configuration entity.

The retrieved, processed or computed degree of success may be a result of failure/success of the last computed time-sensitive network scheduling. Such result is determined and provided by the centralized network configuration entity and may be stored along with the tested configuration of the dynamic bridge. Storing such result may be useful for long-term statistics.

The retrieved or computed degree of success may include more detailed information than a global result of failure/success. In such case, the computation of the result of failure/success may be performed and immediately used, by the same entity, as "information related to the last computed time-sensitive network capability" to determine whether or not to provide information related to an updated time-sensitive network capability to the centralized network configuration entity.

More generally, the decision not to give a new TSN capability of the DB may result of meeting one of the following criteria.

A criterion may be that the obtained information related to TSN scheduling indicates a success of the last computed TSN scheduling. A criterion may be that the figure of Merit (FoM) result related to the information related to TSN scheduling is above a predetermined threshold.

Meeting one of these criteria results in exiting the TSN scheduling loop as soon as the requirements associated to the set of stream requests are met, and allows immediately starting the TSN configuration process.

A criterion may be that the maximum number of new trial configurations is reached. An effect of such criterion is to set a time limit to the processing time allowed for computing possible TSN schedulings.

In an example, the method further comprises processing, in response to at least one request of the set of stream requests, information related to a degree of success of at least one computed time-sensitive network scheduling in terms of satisfying at said at least one request, and determining whether to provide information related to an updated time-sensitive network capability of the dynamic bridge to the centralized network configuration entity is based on said information related to the degree of success of said at least one computed time-sensitive network scheduling in terms of satisfying said at least one request.

For example, the network may comprise a centralized user configuration (CUC) entity, and the retrieved failure/success information on the TSN scheduling may be feedbacked to the centralized user configuration entity.

In turn, if a success is feedbacked, the centralized user configuration entity may for example validate the set of stream requests.

If, on the contrary, an overall failure is feedbacked for the best-found configuration, the centralized user configuration entity may for example modify the set of stream requests in order to improve the chances to compute a scheduling allowing reaching the sought connectivity.

In an example, the method further comprises obtaining a set of predefined time-sensitive network configurations of the dynamic bridge entity, wherein the initial time-sensitive network capability and each subsequently updated time-sensitive network capability each correspond to a respective configuration of the set of predefined time-sensitive network configurations of the dynamic bridge entity.

Indeed, the TSN capabilities of a dynamic bridge can be obtained from TSN configuration of the dynamic bridge.

Considering all the possible TSN configurations of the dynamic bridge, how to select a specific updated TSN capability of a dynamic bridge may be performed differently depending on the nature of the available information related to at least the last computed TSN scheduling.

If only an indication of failure, an indication of success, or a global Figure of Merit function related to at least the last computed TSN scheduling is obtained from the centralized network configuration entity, then the updated TSN capability to be provided to the centralized network configuration entity may be selected out of a set of predefined TSN configuration sets.

Alternately, the updated TSN capability to be provided to the centralized network configuration entity may be selected out of a random set of pre-selected TSN configuration sets. In other words, in an example, the method further comprises, upon determining that the information related to the updated time-sensitive network capability are to be provided to the centralized network configuration entity, providing, as the information related to the updated time-sensitive network capability, an information related to a randomly selected internal configuration among a set of predefined internal configurations. Internal configurations are configurations that are, at least, stored in one or more storage units that are internal to the dynamic bridge.

Alternately, the updated TSN capability to be provided to the centralized network configuration entity may be obtained by using an optimization algorithm, e.g. based on a genetic algorithm approach and using information about already tested dynamic bridge configurations. For instance, a first parameter perturbation round may be based on storing the effect of a parameter perturbation and choosing the best TSN configuration out of said parameter perturbation as the new starting point of the next parameter perturbation round. In other words, in an example, the method further comprises, upon determining that the information related to the updated time-sensitive network capability are to be provided to the centralized network configuration entity, providing, as the information related to the updated time-sensitive network capability, an information related to a configuration which is selected among the set of predefined time-sensitive network configurations based on a result of an optimization algorithm.

If more information is obtained from the centralized network configuration entity, such as per stream information or such as a non-binary degree of success, several additional possibilities can be used to select the updated TSN capability to be provided to the centralized network configuration entity.

In an example, the optimization algorithm is implemented on an entity configured to:

obtain, for a given configuration of the dynamic bridge, information related to a degree of success of a given time-sensitive network scheduling in terms of satisfying at least one stream request of the set of stream requests, predict, based on the obtained information, an information related to a degree of success, in response to at least one request of the set of stream requests, of a modified time-sensitive network scheduling that would be computed for a given modified configuration of the dynamic bridge, and based on the predicted information, output an updated time-sensitive network capability corresponding to the given modified configuration of the dynamic bridge as the result of the optimization algorithm.

As a result, it is possible to select a TSN configuration which optimizes the quality of service for a single stream, or for a predetermined subset of the set of streams.

In an example, the optimization algorithm is implemented on an entity configured to:

identify at least one entity within the time-sensitive network having a higher contribution to end station to end station delay comparatively to the other entities of the time-sensitive network, select at least one stream request of the set of stream requests based on the identified entity, obtain, for a given configuration of the dynamic bridge, information related to a degree of success of a given time-sensitive network scheduling in terms of satisfying the at least one selected stream request, predict, based on the obtained information, an information related to a degree of success, in response to the selected at least one request of the set of stream requests, of a modified time-sensitive network scheduling that would be computed for a given modified configuration of the dynamic bridge, and based on the predicted information, output an updated time-sensitive network capability corresponding to the given modified configuration of the dynamic bridge as the result of the optimization algorithm.

For instance, a component within the network producing a largest partial contribution to e2e delay for at least one stream may be identified. Then, if the component is served by the dynamic bridge, the corresponding served end station may be identified. The updated TSN capability to be provided to the centralized network configuration entity may be selected in view of specifically improving the performance of the dynamic bridge for at least one stream path serving said end station. The improvement of the performance may refer for instance to the reduction of the latency within the dynamic bridge.

For instance, if the dynamic bridge is a 5G system, the end station is associated with a user equipment (UE), and the parameters of this UE can be changed (resource allocation, hand over, quality of service, etc.).

Similarly, the component served by the DB having the highest contribution to the e2e delay, all streams considered, may be identified. Then, the updated TSN capability to be provided to the centralized network configuration entity may be selected in view of specifically improving the performance of the dynamic bridge for the stream paths served by said component.

Similarly, it is possible to optimizing the performance of two (or more) components served by the dynamic bridge according to priorities computed from the information obtained from the centralized network configuration entity.

In an example, determining whether to provide information related to an updated time-sensitive network capability to the centralized network configuration entity is performed at the centralized network configuration entity.

Therefore, the decision-making is performed by an entity having full access to the information stored at the centralized network configuration entity. Such stored information may include information related to the computed TSN scheduling results (such as a gate control list for all elements in the network) and/or information related to the network (such as the topology and the TSN capabilities of all static components), and/or the TSN scheduling itself, and/or the result of a Function of Merit associated with the TSN scheduling procedure.

The entity performing the decision-making further has an external link with the dynamic bridge entity and a specific signaling to obtain information from the dynamic bridge, such as a set of available configurations or the current configuration parameters of the dynamic bridge.

In an example, determining whether to provide information related to an updated time-sensitive network capability to the centralized network configuration entity is performed at the dynamic bridge.

In such example, the decision-making is performed by an entity having full access to the information stored at the dynamic bridge, therefore to the possible configurations of the dynamic bridge. The entity further has an external link with the centralized network configuration entity to obtain information on any computed TSN scheduling, such as a failure/success indicator or a "degree of success" of said scheduling per stream, or information related to the TSN scheduling itself (e.g. gate control list, per stream priority), or the current configuration parameters of the dynamic bridge).

In an example, determining whether to provide information related to an updated time-sensitive network capability to the centralized network configuration entity is performed at a standalone entity operably connected to the dynamic bridge and to the centralized network configuration entity.

Such standalone node has external links both to the centralized network configuration entity and to the dynamic bridge and may be adapted transparently to preexisting networks.

In an example, determining whether to provide information related to an updated time-sensitive network capability to the centralized network configuration entity is performed at an entity comprising a first module embedded in the dynamic bridge and a second module embedded in the centralized network configuration entity, the first module being operably connected to the second module.

The link between the first module and the second module is an internal link.

Such entity has full access both to information stored at the centralized network configuration entity and to information stored at the dynamic bridge, in order to more accurately predict which TSN configuration of the dynamic bridge should be tested next and to reduce the number of possible configurations that are to be tested to find a successful configuration meeting the requirements associated to the set of stream requests.

It is further disclosed a time-sensitive network system comprising at least a centralized network configuration entity operably connected to a plurality of end station entities and to a dynamic bridge entity, the centralized network configuration entity being configured for,
upon obtaining a set of stream requests from and/or to at least part of the plurality of end station entities, computing, based on an initial time-sensitive network capability obtained at least from the dynamic bridge entity, an initial time-sensitive network scheduling that sets times of transmission and of reception of packets through the network at least from one end station of the plurality of end stations to another,
upon obtaining provided information related to an updated time-sensitive network capability of the dynamic bridge, computing an updated time-sensitive network scheduling based on the provided information, and
determining, based on at least one computed time-sensitive network scheduling, whether to configure the time-sensitive network according to one of said at least one computed time-sensitive network scheduling or to request an adjustment of at least one stream request in view of configuring the time-sensitive network based on a resulting adjusted set of stream requests, at least one entity of the time sensitive network system being configured for performing a sequence of:
determining, based on information related at least to the last computed time-sensitive network scheduling, whether to provide information related to an updated time-sensitive network capability of the dynamic bridge to the centralized network configuration entity,
then, if the information related to the updated time-sensitive network capability are to be provided to the centralized network configuration entity, providing said information to the centralized network configuration entity, and restarting the sequence, and
if the information related to the updated time-sensitive network capability are not to be provided to the centralized network configuration entity, ending the sequence.

It is further disclosed a computer program comprising one or more stored sequence/s of instructions that is accessible to a processing unit and which, when executed by the processing unit, causes the processing unit to carry out the method above.

It is further disclosed a processing circuit equipped with a processing unit operably connected to a memory, the processing circuit being configured to carry out the method above.

DESCRIPTION OF EMBODIMENTS

Figure 1:
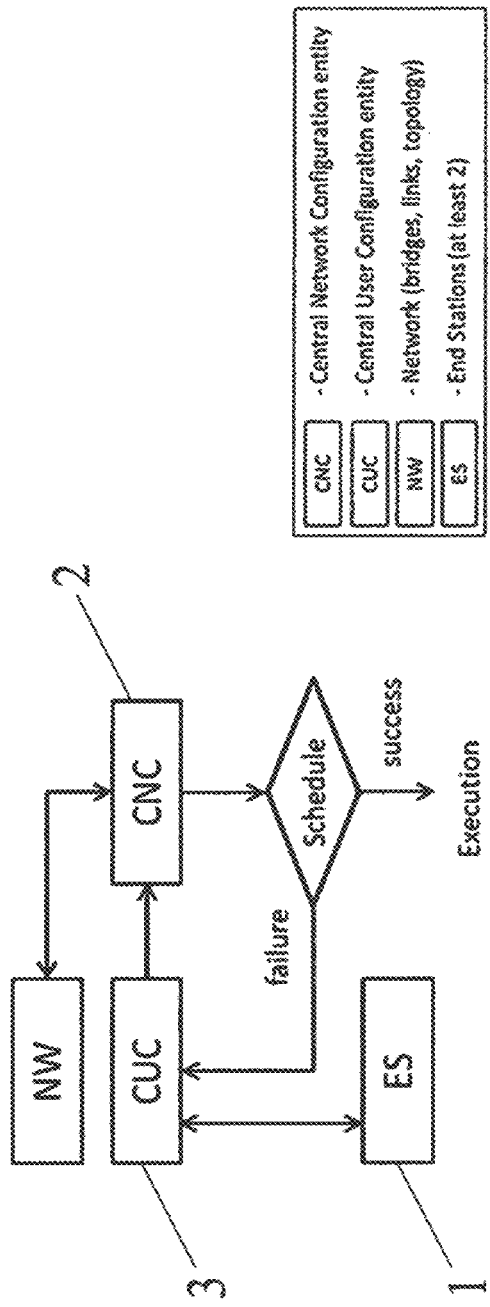
FIG. 1 illustrates a typical TSN configuration loop corresponding to a fully centralized model.

The present disclosure relates generally to a method for processing a set of stream requests in view of configuring a TSN network. In the framework of the present disclosure, the TSN network comprises at least two end stations (1), a Centralized Network Configuration entity (CNC) (2), and a dynamic component (5), e.g. a wireless bridge, e.g. 3GPP/5G system (5GS). In one embodiment, it may also comprise a Centralized User Configuration (CUC) entity (3) being an optional node that discovers end stations (ES), their capabilities and user requirements, and configures their delay-deterministic TSN features. In its turn, the CNC discovers capabilities of network infrastructure (e.g., Bridges) and configures those features.

Unlike prior art related to TSN configuration procedures, that assumes all components (=bridges) having a fixed configuration (in the sense that it can be characterized in having a fixed TSN capability defined by a single set of TSN parameters, e.g. min/max delays per port or per port pair), the present disclosure aims at a new generation of so-called dynamic components (=bridges) capable of supporting at least 2 different TSN capabilities.

Generally speaking, a dynamic bridge can be characterized in having access to a shared limited resource (e.g. to wireless medium used for data transmission characterized by a limited frequency bandwidth or to memory characterized by a limited volume) that can be reallocated in favor of one port (or stream) by the expense of reduced amount of said resource available for other ports (or streams). Such a DB can rely on wired or wireless technologies.

In some embodiments, such a dynamic bridge (DB) can represent a wireless network (e.g. such as 3GPP/5GS), whose TSN capability can vary depending on the radio resource allocation (RA) selected by said DB to support a requested data traffic with a guaranteed quality of service (QoS).

One skilled in the art can further envisage other types of dynamic components (wired or wireless) generally characterized in their capacity of supporting at least two different internal configurations associated with different TSN capabilities.

The TSN capability of a DB can be described using a set of TSN parameters, such as minimum and maximum values of independent and dependent delays per port of said DB, as well as a transmission delay defined for all links connecting said DB with adjacent components. It can further be described in terms of any other information necessary to define deterministic data paths, latency, and packet delay variation (jitter) per port or port pair of said DB for each traffic type supported by the network.

The TSN capability of a DB can be estimated for each internal configuration. It may further depend on the traffic load related to both TSN services and non-TSN services supported by said DB. If the bridge TSN capability varies based on the configuration of internal features of the DB, the TSN capabilities are returned according to the current internal configuration of the DB.

Hereafter the term 'internal configuration' is used to denote a configuration of internal features of the DB that eventually defines its TSN capabilities, described by a set of TSN parameters such as min/max delays per port or per port pair, jitter, bandwidth, etc.

Note that the 'internal configuration' is different from the 'TSN configuration' that is imposed to DB by CNC when a successful TSN schedule is found and executed). Unlike the 'internal configuration', the TSN configuration provided by CNC comprises per port and/or per stream instructions described, for instance, in terms of a gate control list.

In some embodiments, DB represents a 3GPP/5G system (5GS) acting as a wireless bridge, characterized in: comprising a core network, at least one base station connected to the core network, and at least two UEs (user equipment) connected to said at least one base station by using a wireless communication link, said UEs acting as ingress and egress ports of said wireless bridge. It can further comprise a TSN network translator (TT) entity capable of hiding the internal settings of 5GS from CNC.

Figure 2:
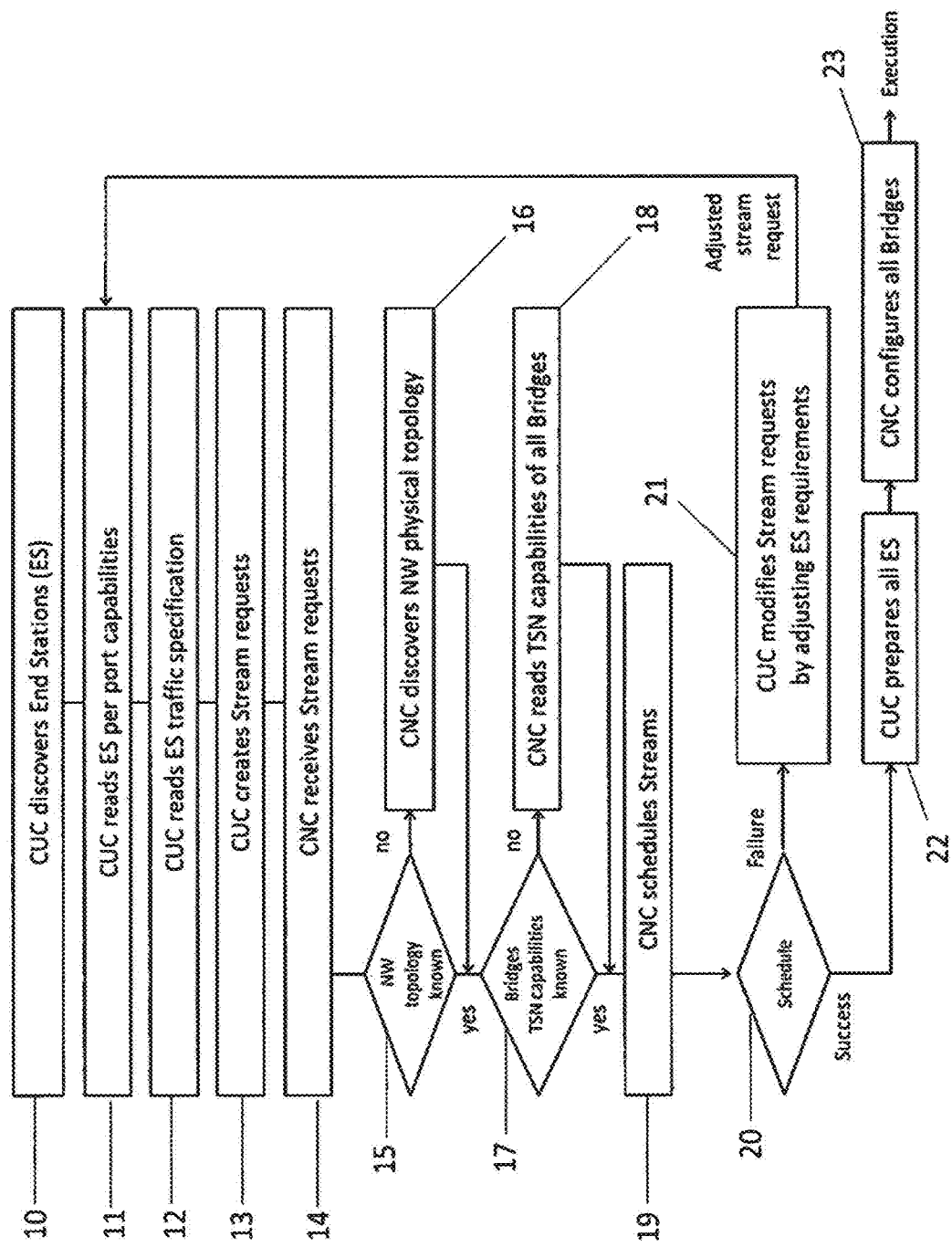
FIG. 2 illustrates a flow chart of the TSN scheduling workflow according to the example of FIG. 1.

Such a wireless bridge can be integrated in a wired TSN network intended, for instance, for a factory automation (FA) use case. To meet requirements of such a challenging use case, a centralized configuration model has been proposed in IEEE 802.1Qcc and is characterized in a sequence of steps executed by CUC and CNC entities as illustrated in FIG. 2.

More specifically, in the centralized model, a Centralized User Configuration (CUC) entity first discovers end stations (ES), retrieves ES capabilities and user requirements, and configures TSN features in said end stations. The configuration information is then provided to a Centralized Network Configuration (CNC) entity that discovers the physical topology of the network (i.e. components, number of ports for each component, length/speed/bandwidth of the links between the components, etc.), reads TSN capabilities of each bridge (e.g. dependent and independent delays per port and traffic type), and, using this information, generates a per-port and/or per-stream schedule for each component within the TSN domain of the network aimed at satisfying the at least one stream request provided by CUC.

If successfully done, said schedule is used for time-sensitive communication after the completion of two additional steps executed by CUC and CNC, respectively, of configuring the ES and the Bridges in accordance with said successful TSN scheduling generated by CNC.

Alternatively, if CNC fails to find a schedule that satisfies all stream requests provided by CUC, an additional iteration of the TSN configuration procedure is initiated comprising a step of adjusting the initial stream requests. The adjustment typically concerns relaxing of the end-to-end (e2e) delay for at least one stream.

The centralized model typically assumes that CNC has a complete view of the physical topology of the network (NW) as well as about the TSN capabilities of all component within the TSN domain of a network. Under assumption that all components are static, the steps of the NW discovery and readout of the static bridge TSN capabilities can be completed only once for each new (or adjusted) stream request provided by CUC. For sake of time, these two steps (i.e. discovery and readout) are typically skipped during later iterations, unless the physical topology of the network is changed for a purpose.

This established procedure does not provide means for CNC to obtain information about the configuration of internal features of a DB resulting in different TSN capabilities. Moreover, it does not provide means for CNC to test these different internal configurations, characterized by different TSN capabilities, and finding a TSN capability resulting in the most efficient TSN scheduling as a whole.

Figure 3:
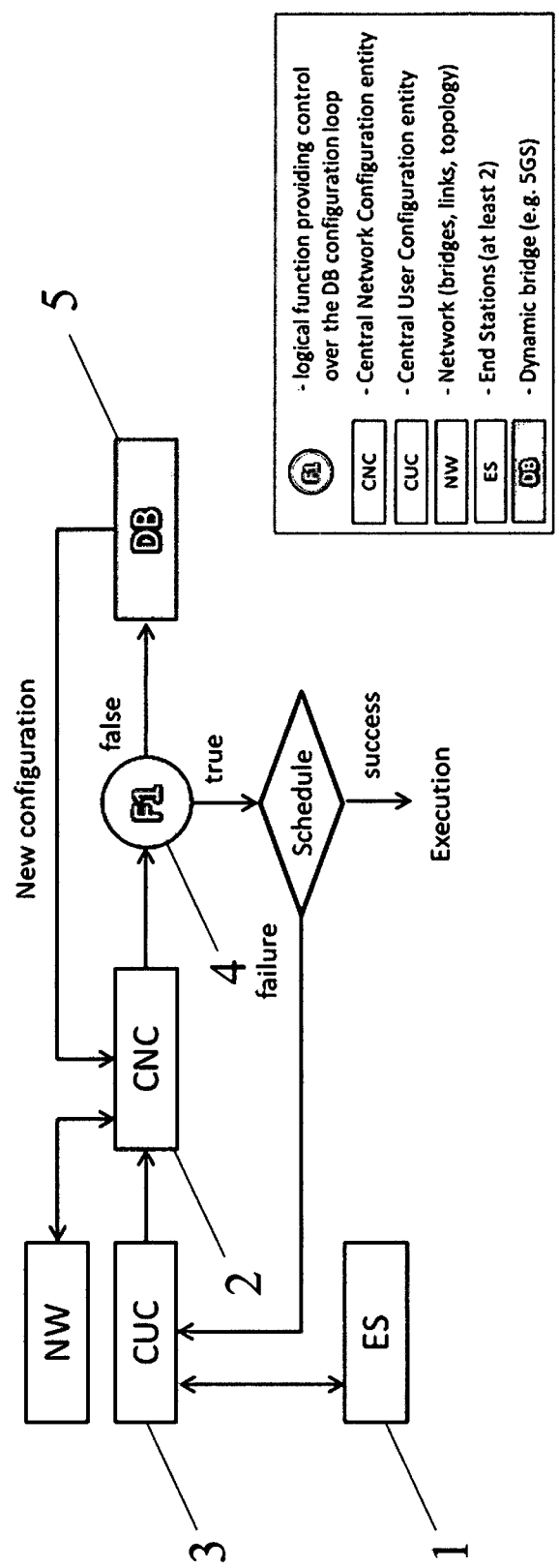
FIG. 3 illustrates a flow chart illustrating an example of a proposed modification of the established TSN configuration procedure.
Figure 4:
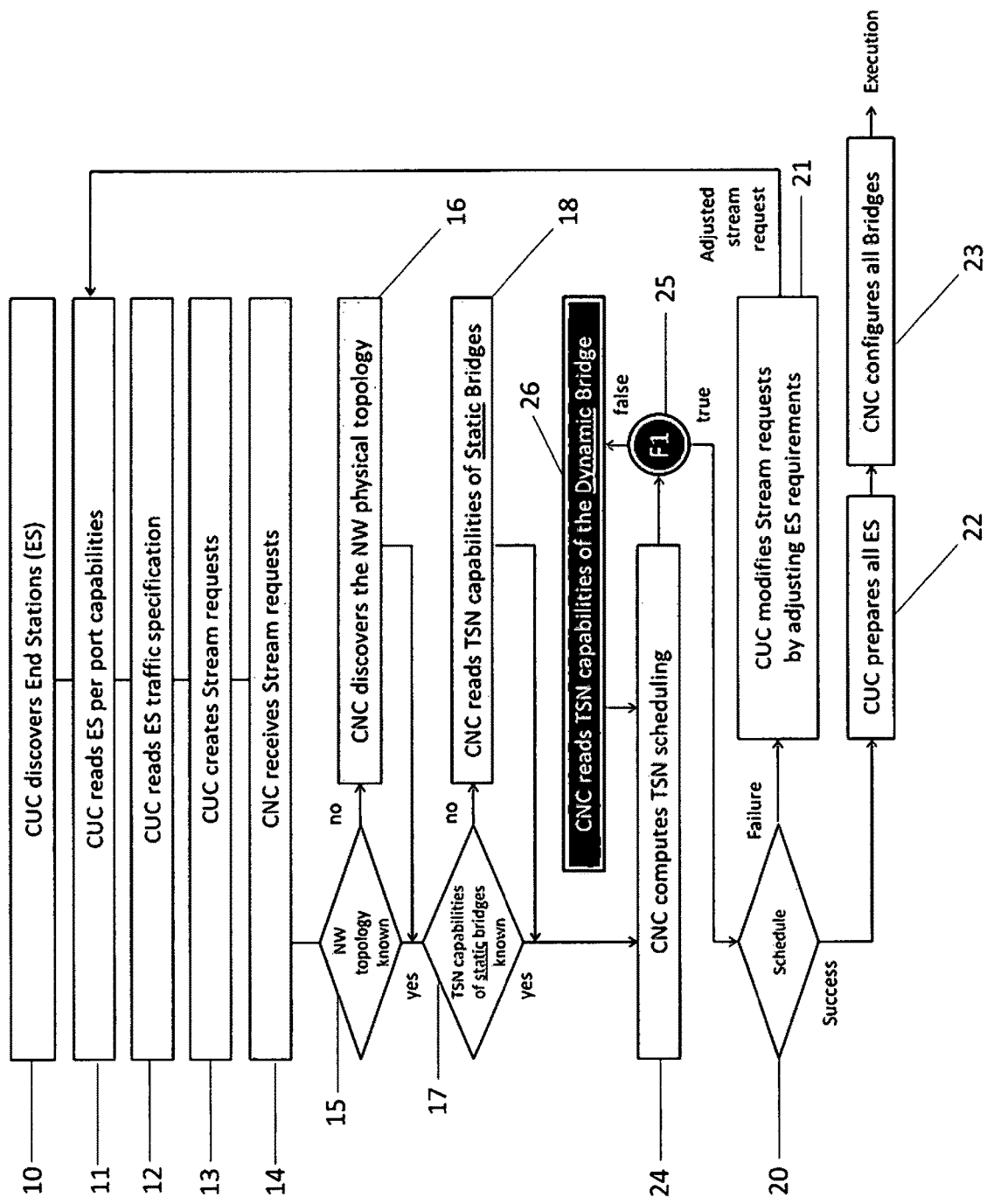
FIG. 4 illustrates a modified workflow comprising an example of a dynamic bridge configuration loop triggered by a logical function.

These limitations prevent DB from performing at its best when integrated in a TSN network and, as a consequence, degrade the TSN network performance as a whole To overcome these constraints, a new method of configuring a TSN network comprising at least a DB is proposed based on a new logical function (4) that enables control over a DB configuration loop. The logical scheme of the modified TSN configuration procedure is illustrated in FIG. 3. A workflow of the modified TSN configuration procedure is illustrated in FIG. 4.

A new logical function (F1) (4) is introduced to enable control over a DB configuration loop that allows CNC to execute (27) several TSN scheduling trials, associated with different TSN capabilities of said DB, and then to select the best-found configuration of said DB for further execution.

Said logical function is characterized in its capability of obtaining information related to the TSN scheduling and, in particular, about the degree of success of the TSN scheduling procedure executed by CNC for different internal configurations of said DB described by different TSN capabilities, and then deciding (25), based on this information, whether (or not) a new configuration of said DB is to be tested.

In some embodiments, said F1 can be represented by a cycle operator (e.g. Do or Do while loop) that allows CNC to sequentially read and assess all (or at least a few) possible TSN capabilities of said DB.

The exit condition of said DB configuration loop triggered by F1 can be, for instance, a predefined number of iterations or a logical event related to the TSN scheduling procedure.

The former (i.e. max number of iterations) can be defined arbitrarily or with respect to a maximum number of possible TSN capabilities supported by said DB.

The latter (i.e. logical event) can be associated with the value of a figure of merit (FoM) function related to the TSN scheduling procedure executed by CNC.

In some embodiments, this can be a binary event of success or failure.

Alternatively, this can be the achievement of a threshold associated with the value or with the convergence rate of said FoM function.

In case of success, the current trial configuration of said DB can be used for further execution in line with the established workflow illustrated in FIG. 2.

Alternatively, in case of failure, said logical function F1 can trigger a new iteration of the DB configuration loop comprising a step of CNC reading (26) a new TSN capability of said DB and re-computing (24) the TSN scheduling for at least one stream passing through said DB.

As described above, information related to a TSN scheduling computed by the CNC may be used by the logical function F1 to decide whether to trigger a new iteration of the DB configuration loop or to exit the loop. More details about the information related to the computed TSN scheduling are provided below.

Figure 5:
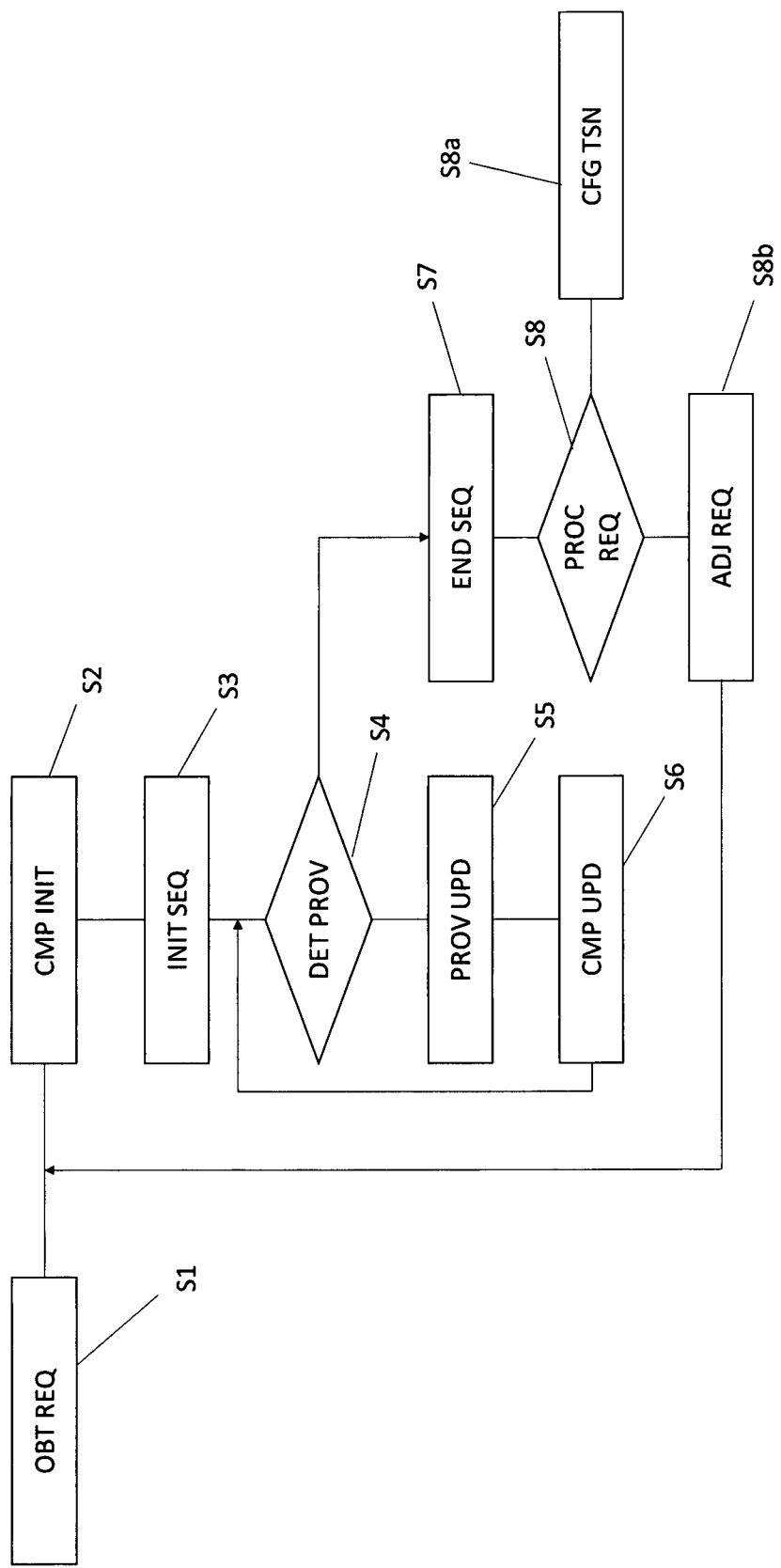
FIG. 5 depicts a flow chart of an example of a method for processing stream requests in view of configuring a time-sensitive network.

It is now referred to FIG. 5, which depicts an exemplary method for processing stream requests in view of configuring a TSN network.

At an initial instant, the CNC obtains OBT REQ (S1) a set of stream requests from one or more DB. Said one or more DB have an initial configuration associated to initial TSN capabilities. The CNC further obtains the TSN capabilities, at the initial instant, of the one or more DB.

Upon obtaining the set of stream requests, the CNC computes CMP INIT (S2) an initial TSN scheduling based on the initial TSN capabilities of the one or more DB. The initial TSN scheduling is a scheduling of times of transmission/reception of packets between different end stations in the TSN network.

Computing the initial TSN scheduling also corresponds to initiating INIT SEQ (S3) a sequence, or loop, that is piloted by the logical function F1, which implemented on whichever entity of the TSN network.

The first iteration of the sequence, or loop, comprises determining DET PROV (S4) whether or not to provide further TSN capabilities of the one or more DB to the CNC, in other words, whether or not to inform the CNC about a potential TSN capability of the one or more DB if said one or more DB had a different configuration.

Determining whether or not to provide further TSN capabilities of the one or more DB to the CNC is based on information related to the computed initial TSN scheduling.

For example, the loop may be designed to be repeated at most a given number of times. In other words, for each iteration of the loop, a count of computed schedulings may be incremented by 1. In this regard, the information related to the computed initial TSN scheduling may be an initial value of the count of computed schedulings.

For example, the loop may be designed to be repeated as long as the last tested TSN scheduling does not comply to preset requirements associated to the set of stream requests. These requirements may involve, in general, one or more communication quality indicators, such as indicators of packet loss, latency, jitter, and the like. Depending on the information available as input to the entity implementing the logical function F1, the communication quality indicators may be related to overall communication between all end stations, or may be each related to a corresponding stream.

In this regard, the computed initial TSN scheduling may be evaluated by the logical function F1 with regard to compliance to said preset requirements, the result of the evaluation forming information related to the computed initial TSN scheduling.

If it is determined that further TSN capabilities shall be provided to the CNC, the logical function (F1) instructs to provide PROV UPD (S5) provide updated TSN capabilities regarding one or more DB to the CNC. These updated capabilities correspond to a configuration of the DB which has not been tested during a previous iteration of the loop.

Then, based on the updated TSN capabilities, the CNC computes CMP UPD (S6) an updated TSN scheduling.

This computation initiates a subsequent iteration of the loop.

Each subsequent iteration of the loop comprises determining DET PROV (S4) whether or not to provide further TSN capabilities of the one or more DB to the CNC, based on information related to the latest computed TSN scheduling.

As described above, the loop may be exited based on a criterion related for example to compliance with requirements associated to the set of stream requests, or on a criterion related for example to a maximum number of DB configurations to be tested.

In such case, it is determined to end END SEQ (S7) the sequence without providing any further TSN capabilities of the one or more DB to the CNC.

The set of stream requests may then be processed PROC REQ (S8) according to the computed TSN scheduling corresponding to the best-found configuration of the one or more DB, i.e. the configuration allowing the best quality of service.

If the best-found configuration is in line with the requirements, then the one or more DB are configured CFG TSN (S8a) by the CNC accordingly.

If, on the contrary, none of the tested configurations allow complying with the requirements, then the configuration search procedure has failed for the set of stream requests having been used as an input. As a result, it may be requested to adjust ADJ REQ (S8b) the set of stream requests and repeat the whole procedure.

Figure 6:
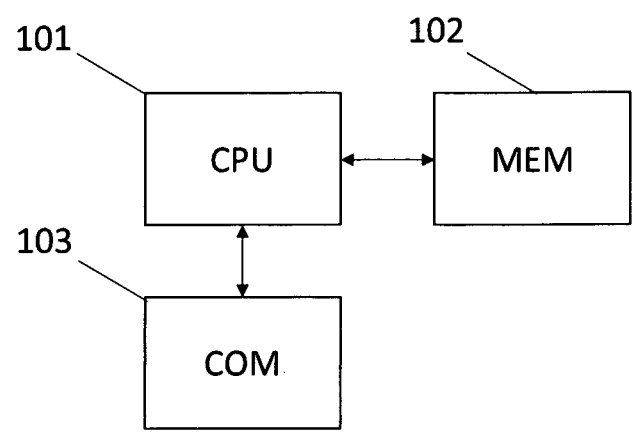
FIG. 6 depicts an example of a processing circuit of an entity configured to carry out the method of FIG. 5.

It is now referred to FIG. 6, which depicts an example of a processing circuit implementing the above logical function F1. The processing circuit may be incorporated in the CNC, or be incorporated in a DB, or form a standalone node.

The processing circuit comprises a processing unit CPU (101) operably connected to a memory MEM (102) and to one or more communication interfaces COM (103).

The memory comprises instructions of a program comprising one or more stored sequences of instructions that is accessible to the processing unit and which, when executed by the processing unit, causes the processing unit to carry out the above logical function F1.

The one or more communication interfaces COM allow the processing circuit to communicate both with the CNC and with the one or more DB.

Information Related to TSN Scheduling

In some embodiments, the information related to the TSN scheduling can comprise a single value of a binary success/failure figure of merit (FoM) function representing the outcome of the TSN scheduling procedure as a whole, e.g.

$P=1$, if all streams requests are satisfied and $P=0$, if at least one stream request failed. (1)

Alternatively, the information related to the TSN scheduling can comprise a real value parameter representing the degree of success of the TSN scheduling as a whole. For instance, in case of N streams, it can be defined as $$P = \frac{1}{N}\sum_{n=1}^{N} P_n \quad (2)$$

where $P_n$ is a per-stream binary function equal to 1 or to 0 for, respectively, a success or a failure status.

According to the definition provided in Eqn. (2), the success criterion for the TSN scheduling as a whole can be defined as $P=1$ that corresponds to success status for all N stream requests, whereas the failure criterion for the TSN scheduling as a whole is defined as $P<1$ that corresponds to a failure of at least one stream request.

In another embodiment, the information related to the TSN scheduling can comprise a set of values (binary or real) representing a "degree of success" per stream defined in terms of a ratio between the requested end-to-end (e2e) delay and the one provided by the TSN schedule, i.e.

$$P_n = \frac{\text{Delay}E2E\_\text{requested}(n)}{\text{Delay}E2E\_\text{scheduled}(n)} \quad (3)$$

where $n=1,2,\ldots,N$ is a stream number.

According to the definition provided in Eqn. (3), a per-stream success and failure criteria are defined as $P_n \geq 1$ and $P_n < 1$, respectively.

Furthermore, the information related to the TSN scheduling can further comprise information about the TSN schedule itself (e.g. gate control list, per stream priority, etc.) as generated for at least one port of at least said DB, or said DB and at least another component in the path of a stream passing through said DB, or DB and at least another component within the TSN domain. This complementary information can be used, for instance, to estimate partial contribution of each component to the overall e2e delay for each stream:

$$\text{Delay}E2E_{scheduled(n)} = \Sigma_{k(n)=1}^{K(n)} D_{k(n),n} \quad (4)$$

where $k(n)$ is the reference number of a component in the path of n-th stream and $K(n)$ is the overall number of components along the n-th stream path and where $D_{k(n),n}$ is the total delay induced by the $k(n)$ component in the n-th stream (the components are typically bridges which involve delay that is independent of frame length, plus the delay that is dependent on frame length, such as internal "processing", "queueing" and frame-length dependent delays associated with the bridge, and "propagation delay" associated with links connecting adjacent bridges).

In general, when $k(n)$ is related with one DB ($k(n)=kDB$), the delays $D_{kDB,n}$ are inter-dependent, for example, they are linked by a constraint such as $$\Sigma_{n=1}^{N} D_{kDB,n} = \text{constant value} \quad (5)$$

where N is the total number of streams passing through said DB.

It may be understood then that the figure of merit of all the streams flowing through said DB are interdependent, i.e., changing some internal features of the DN that affect one $D_{kDB,n}$ value and by consequence the figure of merit of the n-th stream, will also change at least another $D_{kDB,n}$ value and by consequence the figure of merit of other streams. An example of using this type of constraint is provided in a later section of this document, in link with Eqn. (10).

In the real world, the situation is of course more complex because different internal configurations of the DB can result in the same TSN capabilities. At the same time, a variation of a single feature in the internal configuration of said DB can impact TSN capabilities of one port (or a port pair associated with a stream) or for multiple ports.

However, what is essential is that, because the shared resource is limited, attributing a larger portion of this resource to one port/stream naturally results in less resource available for other ports/streams that makes all ports 'interdependent'. Depending on the amount of the shared resource, the impact of a single parameter perturbation on the other system parameters can be different: the larger part of the shared resource in use, the stronger the impact can be expected.

Combining information about scheduled delays per port and per component with the knowledge of TSN capabilities of all components, the improvement potential in terms of an accumulated delay per component and per stream as a whole can be further estimated, for instance, as follows:

$$ImprovementPotentialComponent(n) = \frac{D_{k(n),n} - D_{k(n),n}^{min}}{D_{k(n),n}^{min}} \quad (6)$$

$$ImprovementPotentialStream(n) = \frac{\sum_{k(n)=1}^{K(n)} \left(D_{k(n),n} - D_{k(n),n}^{min}\right)}{\sum_{k(n)=1}^{K(n)} \left(D_{k(n),n}^{max} - D_{k(n),n}^{min}\right)} \quad (7)$$

where $D_{k(n),n}^{min}$ and $D_{k(n),n}^{max}$ are the minimum and maximum per-port and/or per port pair delays associated with the n-th stream passing through a k-th component.

Note that zero improvement potential for a component means that said component works at its best.

The improvement potential for a component can further take into account the per-port information related to multiple streams passing through each port and the cumulative traffic load on each port.

Finally, the improvement potential can also be estimated for the TSN schedule as a whole, for instance, as a weighted sum of the improvement potentials for all components within the TSN domain of the network.

Note that the exemplary definition for the per-stream improvement potential provided in Eqn. (7) is valid both for successful stream requests (characterized by ImprovementPotentialStream(n)∈[0,1]) and for failed stream requests (characterized by ImprovementPotentialStream(n)<0 or >1) and thus can be effectively used in combination with a binary success criterion (e.g. Eqn. (1) or (2)) to differentiate and to rank different configurations of the DB leading to overall failure as well as overall success of the TSN scheduling as a whole.

Retrieving or Computing the Overall Success/Failure of the TSN Scheduling Procedure Depending on the type of the information related to the TSN scheduling received by the logical function, an overall success/failure information on the TSN scheduling can be retrieved or computed.

For instance, in case of a binary FoM function representing the success/failure of the TSN scheduling as a whole, e.g. defined by Eqn. (1) or (2), it can be retrieved directly from the value of P.

Alternatively, if only TSN schedule is available, the e2e delay can first be computed for each stream using Eqn. (4) and then compared with the requested e2e delay per stream. Finally, the overall success can be retrieved if Pn≥1 for all n.

In one embodiment, results of all trials (performed for different TSN capabilities of said DB) can be stored and used later to find the best of the tested DB configurations. The overall success/failure criterion of the TSN scheduling procedure can then be retrieved or computed as explained above for at least the best tested DB configuration. If the best tested DB configuration is considered as sufficiently good (e.g. resulting in the overall success of the TSN scheduling as a whole) then this best DB configuration is used for further execution. Alternatively, if none of the tested DB configuration can simultaneously satisfy all stream requests, then it is considered as a failure of the TSN scheduling as a whole. In line with the established workflow [2], in such a case the CNC returns the failure status to the CUC that might decide to adjust stream requirements and to launch a new iteration of the TSN scheduling procedure.

In one embodiment, it can be beneficial to provide the network with at least one Centralized User Configuration (CUC) entity capable of discovering end stations (ES), retrieving ES capabilities and user requirements, and configuring TSN features in said end stations. Said CUC can further receive the retrieved (or computed) success/failure information from the logical function and, depending on the received information, decide whether to configure end stations for using the successful schedule generated by CNC or to adjust stream requests and launch a new iteration of the TSN configuration procedure (see FIG. 4).

In one embodiment, the intelligence of the logical function F1 can further be improved by gathering information related to the TSN scheduling and using this information for guiding the selection process.

In particular, instead of a single value of the FoM function describing the success of the scheduling procedure as a whole, said information related to TSN scheduling can comprise a set of values (binary or real) representing a "degree of success" of said Schedule per stream. Furthermore, it can comprise information related to the TSN scheduling itself (such as per port gate control list, per stream priority, etc.) as it is generated for at least one port of at least said DB. This additional information can be used by F1 to select next trial configuration of said DB and/or to compute the success/failure status for at least one DB configurations (e.g. the best or the last of tested).

Implementation examples for the definition of binary and real value FoM functions describing degree of success of the TSN scheduling procedure are provided in a previous section of this document.

Exit Condition for the DB Configuration Loop

Depending on the selected embodiment, different exit criteria can be used for the DB configuration loop controlled by F1.

In one embodiment, the exit criterion can be defined in terms of a maximum number of iterations of the DB configuration loop. When reached, F1 retrieves or computes the success/failure criterion for the TSN scheduling procedure for at least the one tested configuration and notifies CUC accordingly. This embodiment can beneficially rely on storing all (or at least the best) DB configuration.

Alternatively, the exit criterion can be defined based on a logical condition.

In one embodiment, the decision of not providing CNC with a new TSN capability of the DB can be taken by F1 if the obtained information related to TSN scheduling indicates the overall success of the TSN scheduling procedure. In such a case, the current trial DB configuration can be considered as sufficiently good one and used for further execution.

For instance, if the information related to the TSN scheduling comprise only a binary value of the FoM function defined by Eqn. (1) or (2), the exit condition can be defined as P=1.

In another embodiment, the exit criterion can be defined with respect to a real value of a figure of merit (FoM) function describing a 'degree of success' of the TSN scheduling procedure as a whole or per stream.

For instance, the decision not to provide CNC with a new TSN capability of the DB can be taken by F1 if a stagnation in the improvement of the FoM function is observed for a given number of unsuccessful iterations resulting in overall failure, e.g.

$$\frac{1}{M} \sum_{m=1}^{M} P(m) - P(i) < \delta_p \quad (8)$$

where P( ) is a FoM function defined by Eqn. (2), i is the number of iteration, M is an arbitrary number of past iterations taken into account, and $\delta_p$ is an arbitrary threshold parameter related to the convergence rate defined in terms of a relative improvement of P( ) during M iterations.

Alternatively, the decision not to provide CNC with a new TSN capability of the DB can also be taken by F1 after a series of successful trials, based on a stagnation criterion associated with the rate of improvement of the TSN scheduling defined in terms of a delay or in terms the FoM relative improvement.

Furthermore, the figure of merit and the stagnation criteria can be defined not in terms of a TSN performance indicator (such as e2e delay) but in terms of the quality of service (QoS) related to an application using this TSN scheduling for time-aware communication. For instance, if said application is related to video streaming, said QoS can be associated with the frame rate or resolution of the video. In the context of the factory automation (FA), said QoS can be associated with the reaction time for robot motion control.

In one embodiment, the comparison and ranking of successful DB configurations (e.g. characterized by P=1 in Eqn. (2)), can be done based on the improvement potential determined for at least one component (Eqn. (5)) or one stream (Eqn. (6)), respectively. In such a case, the stagnation criterion for the improvement of the TSN scheduling can be defined in terms of the iterative decrease of the improvement potential of the TSN scheduling during a given number of iterations:

$$\frac{1}{M} \sum_{m=1}^{M} I(m) - I(i) < \delta_i \quad (9)$$

where I( ) is the improvement potential for a component (Eqn. (6)) or for a stream (Eqn. (7)) or for the TSN scheduling as a whole defined as a sum of improvement potentials for all components, i is the number of iterations, M is an arbitrary number of iterations taken into account, and $\delta_i$ is an arbitrary threshold parameter related to the convergence rate of the improvement potential defined in terms of a relative improvement of I( ) during last M iterations.

When/if a threshold exit condition is satisfied, F1 retrieves (or computes) the overall success/failure status for the TSN scheduling procedure for at least one tested internal configuration (e.g. the best or the last one) and notifies CUC accordingly.

Same as above, this embodiment can further be provided with a mean for storing information related to all tested (or at least the best or the last) DB configurations and using this information for example, to compute the impact of the DB parameter perturbation on the evolution of the FoM function.

In its turn, the correlation between perturbation of TSN parameters (describing different TSN capabilities of the DB) and the FoM function describing the degree of success of the TSN scheduling procedure allows implementation of an optimization routine aimed at continuous improvement of the quality of the TSN scheduling as a whole by intelligent selection of each next trial internal configuration of the DB out of several possible ones. Said improvement can be characterized, for instance, in terms of a ratio of the number of successful streams versus the total number of requested streams as described by Eqn. (2).

Alternatively, it can be described in terms of e2e delay reduction for at least one stream (e.g. for the stream characterized by the largest value of $P_n$ defined by Eqn. (3)).

In one embodiment, a simple gradient type optimization method can be implemented through an iterative tuning of at least one TSN parameter and observing the impact of the parameter changes on the value of a FoM function associated with the degree of success of the TSN scheduling procedure (e.g. defined by Eqn. (2)) and/or the improvement potential of said DB or the overall TSN scheduling as a whole.

This embodiment can further be enhanced using different method for selecting the initial guess (e.g. based on random selection or max or min value of each control parameter), smart selection of the search direction (e.g. based on partial derivatives of a multi-parameter FoM function), and adaptive step length (e.g. based on the FoM gradient).

Alternatively, said optimization procedure can be based on a global (e.g. genetic) optimization method characterized in a quasi-random perturbation of TSN parameters describing TSN capability of the DB, estimating the effect of said perturbation, and using one of previously tested configurations as a new starting point of the next parameter perturbation round.

A simple illustrative example is provided hereafter.

Let us consider the index kDB associated to the only DB in the system. We assume that this DB is inherently defined by a base station sharing resource between several terminals. The delay of one terminal n is determined as $$D_{kDB,n} = \frac{L_n}{F_n(\alpha_n)},$$

where Ln is the payload of information to be transmitted for the n-th stream, $F_n(\alpha_n)$ is the data rate function related to a pair of terminals associated to the n-th stream when allocated a portion an of resource. Here we assume that, if there is no stream linked to a terminal in the cell, then there is no resource allocated to this terminal. Provided that the transmission resource is fully used and shared between the serval terminals, we can set the inter-stream constraint, for example, as $\Sigma \alpha_n = 1$. The optimization problem is then for example written as a search for an internal configuration of the DB that aims at reducing the e2e delay at least for a stream characterized by a largest e2e delay:

$$\min\left[\max_n\left(\sum_{k(n)=1}^{K(n)} D_{k(n),n}\right)\right] \quad (10)$$

$$\text{s.t., } \forall n, D_{kDB,n} = \frac{L_n}{F_n(\alpha_n)}$$

$$\sum \alpha_n = 1$$

When the resource can be allocated by using real values, this optimization problem can be solved by using the optimization theory, such as gradient descent.

When the resource is split in elementary blocks, this is a combinatorial optimization problem, which can be solved using for example a genetic algorithm.

Of course, a cellular system is more complicated as:

The rate of one terminal is not only function of the quantity of allocated resource but also to which resource in time and frequency is allocated (as an essential characteristic of OFDM transmission over wireless channels), Several base stations might be present in one DB, which involves that each terminal must be attached to one out of said base stations. This attachment parameter is tunable and impacts the delay as the number of terminals per cell, the quality of the link to an attached based station, the interference between cells, impact the radio link quality and by consequence the rate and delay of transmission.

From this simple example, we understand how the DB creates and interdependence between the delays of the streams, and involves a specific optimization of the TSN network.

Positive Decision Taken by F1 of Providing CNC with a New TSN Capability of the DB In the event of a positive decision taken by F1 regarding the necessity for testing a new TSN capability of said DB, there are several options available for selecting said new capability among possible ones.

In some embodiments, a new TSN capability of the DB can be selected by F1 arbitrarily or randomly among possible TSN capabilities of said DB. Alternatively, all possible TSN capabilities of said DB can be tested sequentially. These two embodiments require F1 being capable of obtaining information about different TSN capabilities supported by said DB, said different TSN capabilities characterized by different sets of TSN parameters, e.g. min and max values of dependent and independent delays per port. Different sets can differ by a value of at least one TSN parameter.

An illustrative example below details a possible way of selecting a specific TSN capability to be tested.

The selection of a new trial TSN capability by F1 can be done using a reference number (provided there is a standard interface available between F1 and DB that allows to match said reference number with a unique set of TSN parameters of said DB) or using a complete set of TSN parameters. In one embodiment, F1 can provide a set of TSN parameters to DB, and said DB just apply them.

In one embodiment, it can be beneficial to sample the range of variation of each TSN parameter in a given number of samples, e.g. 2 s samples, where s is an arbitrary integer number.

The advantage of this method is that such a sampling method does not require knowledge about the absolute value for the range of variation of each TSN parameter. Instead, it only requires the value of s parameter and sampling method (e.g. based on a uniform regular mesh). These two parameters can be defined through a specification or selected arbitrary by CNC or F1 or DB. Whatever is the sampling method, the total number of possible parameter combinations (encoding different TSN capabilities of said DB) can be defined as $$C = n^{s \cdot N_{param} \cdot N_{port}} \quad (11)$$

where $N_{param}$ is the total number of TSN parameters per port and $N_{port}$ is the total number of ports of said DB. The former is usually known from specification, whereas the latter is read by CNC during the network discovery step.

In one embodiment, it may be beneficial to pre-select a given number of TSN capabilities. For instance, a set of pre-selected capabilities (i.e. short list) can comprise a given number of configurations considered as representative examples of a larger set of all possible configurations. For instance, this can be a set of TSN capabilities giving priority to different ports or different port pairs serving different streams. This set can further be complemented with a configuration providing equal TSN capabilities for all ports of the DB.

In yet another embodiment, such a pre-selected set of TSN capabilities of said DB can comprise the most promising configurations selected by F1 according to a criterion, e.g. potentially resulting into a higher degree of success of the TSN scheduling procedure for the network as a whole, said degree of success estimated, for instance, using Eqn. (2) with corresponding values of $P_n$ (representing per stream success/failure status) obtained using a software model of the DB and/or CNC entities that allows to establish a correlation between the TSN capabilities of the DB and the degree of success of the TSN scheduling procedure. Such a software model can represent a light version of the CNC, capable of providing at least a rough estimation for a FoM function for a given TSN capability of the DB.

Finally, in addition to the random and brute-force methods of selecting a new trial configuration among a set of pre-selected configurations or among all possible configurations, a more intelligent procedure can be implemented based on a local (e.g. gradient) or a global (e.g. genetic) optimization method generally characterized in Selecting a first trial TSN capability of the DB, characterized by a set of TSN parameters and obtaining information related to the degree of success of the TSN scheduling procedure, characterized by a FoM function, said information obtained from the CNC after executing the TSN scheduling procedure or from a software model, Selecting a second trial configuration, characterized by another set of TSN parameters different from the first set of parameters by a value of least one parameter value, and obtaining information related to the degree of success of the TSN scheduling procedure, characterized by a FoM function, for said second configuration, Evaluating the impact of the change of said at least one parameter on the FoM function, and Using at least one of said first and second configurations as the starting point of the next parameter perturbation round.

Implementation of the Logical Function

There are several options available for implementation of the logical function.

For instance, it can be implemented as a standalone node between CNC and DB, embedded in CNC, embedded in DB, or split between CNC and DB.

Whatever the selected implementation, it is assumed that said logical function has an internal link with the host entity (e.g. to CNC if implemented in CNC) that allows full access to information related to said host entity. It further assumes that the logical function has an external link with another entity, different from the host one, said external link used to obtain information (partial or full) related to said another entity through a specific interface or signaling.

In case if the logical function is implemented as a standalone node in between CNC and DB, it should have external links with both entities.

On the opposite, if the logical function is split between CNC and DB, it can have internal links to both entities and an internal link between the sub-blocks of said logical function, i.e. F1-CNC embedded in CNC and F1-DB embedded in DB.

The information related to CNC that can be fully (in case of the internal link) or at least partly (in case of the external link) accessible by F1 comprises:

Information related to TSN scheduling, comprising: information related to FoM function and the schedule itself for said DB and for all other components within the TSN domain of the network, Information related to the stream requests, comprising end station TSN capabilities, stream requests, per-stream e2e latency and deadlines, etc., Information related to the network, comprising NW physical topology and TSN capabilities of all static components, Information related to the software model of the CNC allowing to estimate the degree of success of the TSN scheduling procedure for a given TSN capability of the DB.

The information related to DB that can be fully (in case of the internal link) or at least partly (in case of the external link) accessible by F1 comprises:

Information related to topology of the DB, e.g. number of ports and links to adjacent components, Information related to TSN capabilities of the DB, Information related to the current configuration of the DB, Information related to the software model of the DN allowing to predict the effect of a parameter perturbation on its TSN capabilities.

The invention claimed is:

1. A method of processing a set of stream requests in view of configuring a time-sensitive network comprising at least a centralized network configuration entity operably connected to a plurality of end station entities and to a dynamic bridge entity, the method comprising, upon obtaining a set of stream requests from and/or to at least part of the plurality of end station entities:

at the centralized network configuration entity, computing, by the centralized network configuration entity, based on an initial time-sensitive network capability obtained at least from the dynamic bridge entity, an initial time-sensitive network scheduling that sets times of transmission and of reception of packets through the time-sensitive network at least from one end station entity of the plurality of end station entities to another, performing a sequence of:

determining, by an entity performing decision-making which is an entity having full access to information stored at the centralized network configuration entity, based on information related at least to a last computed time-sensitive network scheduling, whether to provide information related to an updated time-sensitive network capability of the dynamic bridge entity to the centralized network configuration entity, then, if the information related to the updated time-sensitive network capability of the dynamic bridge entity are to be provided to the centralized network configuration entity, providing the information related to an updated time-sensitive network capability to the centralized network configuration entity, by the entity performing the decision-making, and computing, by the centralized network configuration entity, an updated time-sensitive network scheduling based on the provided information related to the updated time-sensitive network capability and restarting the sequence, and if the information related to the updated time-sensitive network capability are not to be provided to the centralized network configuration entity, ending, by the entity performing the decision-making, the sequence, and determining, by the centralized network configuration entity, based on at least one computed time-sensitive network scheduling, whether to configure the time-sensitive network according to one of said at least one computed time-sensitive network scheduling or to request an adjustment of at least one stream request in view of configuring the time-sensitive network based on a resulting adjusted set of stream requests, the method characterized in that:

information related to the at least one computed time-sensitive network scheduling comprises at least information related to a value of a figure of merit function representing a degree of success of said at least one computed time-sensitive network scheduling in terms of satisfying at least part of the set of stream requests, and/or a plurality of time-sensitive network schedulings having already been computed through previous iterations of the sequence, wherein the determining, by the entity performing the decision-making, whether to provide the information related to the updated time-sensitive network capability to the centralized network configuration entity is further based on comparing a number of computed time-sensitive network schedulings with a predetermined threshold, and/or the method further comprises processing, in response to at least one request of the set of stream requests, information related to a degree of success of at least one computed time-sensitive network scheduling in terms of satisfying said at least one request, and wherein the determining, by the entity performing the decision-making, whether to provide the information related to the updated time-sensitive network capability of the dynamic bridge entity to the centralized network configuration entity is based on said information related to the degree of success of said at least one computed time-sensitive network scheduling in terms of satisfying said at least one request.

2. The method according to claim 1, wherein at least part of the information related to the at least one computed time-sensitive network scheduling is further related to the dynamic bridge entity.

3. The method according to claim 1, further comprising, upon determining, by the entity performing the decision-making, that the information related to the updated time-sensitive network capability are to be provided to the centralized network configuration entity, providing, as the information related to the updated time-sensitive network capability, an information related to a randomly selected internal configuration among a set of predefined internal configurations.

4. The method according to claim 1, further comprising obtaining, by the centralized network configuration entity, a set of predefined time-sensitive network configurations of the dynamic bridge entity, wherein the initial time-sensitive network capability and each subsequently updated time-sensitive network capability each correspond to a respective configuration of the set of predefined time-sensitive network configurations of the dynamic bridge entity.

5. The method according to claim 1, wherein the determining whether to provide the information related to the updated time-sensitive network capability to the centralized network configuration entity is performed at the centralized network configuration entity.

6. The method according to claim 1, wherein the determining whether to provide the information related to the updated time-sensitive network capability to the centralized network configuration entity is performed at the dynamic bridge entity.

7. The method according to claim 1, wherein the determining whether to provide the information related to the updated time-sensitive network capability to the centralized network configuration entity is performed at a standalone entity operably connected to the dynamic bridge entity and to the centralized network configuration entity.

8. The method according to claim 1, wherein the determining whether to provide the information related to the updated time-sensitive network capability to the centralized network configuration entity is performed at an entity comprising a first module embedded in the dynamic bridge entity and a second module embedded in the centralized network configuration entity, the first module being operably connected to the second module.

9. The method according to claim 1, wherein the determining, based on the information related at least to the last computed time-sensitive network scheduling, whether to provide the information related to the updated time-sensitive network capability to the centralized network configuration entity, comprises:
   retrieving or computing, by the entity performing the decision-making, based on the information related at least to the last computed time-sensitive network scheduling, an overall degree of success of the last computed time-sensitive networks scheduling, and
   determining, by the entity performing the decision-making, based on the retrieved or computed overall degree of success of the last computed time-sensitive networks scheduling whether to provide the information related to the updated time-sensitive network capability to the centralized network configuration entity.

10. A non-transitory computer readable medium storing a computer program comprising one or more stored sequence/s of instructions that is accessible to a processing unit and which, when executed by the processing unit, causes the processing unit to carry out the method according to claim 1.

11. A processing circuit equipped with a processing unit operably connected to a memory, the processing circuit being configured to carry out the method according to claim 1.

12. A time-sensitive network system comprising at least a centralized network configuration entity operably connected to a plurality of end station entities and to a dynamic bridge entity,
   the centralized network configuration entity comprising processing circuitry being configured for,
      upon obtaining a set of stream requests from and/or to at least part of the plurality of end station entities, computing, based on an initial time-sensitive network capability obtained at least from the dynamic bridge entity, an initial time-sensitive network scheduling that sets times of transmission and of reception of packets through a time-sensitive network at least from one end station entity of the plurality of end station entities to another,
      upon obtaining provided information related to an updated time-sensitive network capability of the dynamic bridge entity, computing an updated time-sensitive network scheduling based on the provided information, and
      determining, based on at least one computed time-sensitive network scheduling, whether to configure the time-sensitive network according to one of said at least one computed time-sensitive network scheduling or to request an adjustment of at least one stream request in view of configuring the time-sensitive network based on a resulting adjusted set of stream requests,
   at least one entity of the time sensitive network system corresponding to the centralized network configuration entity or the dynamic bridge entity being configured for performing a sequence of:
      determining, based on information related at least to a last computed time-sensitive network scheduling, whether to provide information related to an updated time-sensitive network capability of the dynamic bridge entity to the centralized network configuration entity,
      then, if the information related to the updated time-sensitive network capability are to be provided to the centralized network configuration entity, providing the information related to the updated time-sensitive network capability to the centralized network configuration entity, and restarting the sequence, and
      if the information related to the updated time-sensitive network capability are not to be provided to the centralized network configuration entity, ending the sequence,
   the time-sensitive network system characterized in that:
      information related to at least one computed time-sensitive network scheduling comprises at least information related to a value of a figure of merit function representing a degree of success of said at least one computed time-sensitive network scheduling in terms of satisfying at least part of the set of stream requests, and/or
      a plurality of time-sensitive network schedulings having already been computed through previous iterations of the sequence, determining, by the centralized network configuration entity or the dynamic bridge entity, whether to provide information related to an updated time-sensitive network capability to the centralized network configuration entity is further based on comparing a number of computed time-sensitive network schedulings with a predetermined threshold, and/or
      the centralized network configuration entity being further configured to process, in response to at least one request of the set of stream requests, information related to a degree of success of at least one computed time-sensitive network scheduling in terms of satisfying said at least one request, and wherein the determining, by the centralized network configuration entity or the dynamic bridge entity, whether to provide the information related to the updated time-sensitive network capability of the dynamic bridge entity to the centralized network configuration entity is based on said information related to the degree of success of said at least one computed time-sensitive network scheduling in terms of satisfying said at least one request.

* * * * *